(12) United States Patent
Finkelstein

(10) Patent No.: US 10,425,114 B2
(45) Date of Patent: Sep. 24, 2019

(54) SYSTEMS AND METHODS FOR DETERMINING CABLE MODULATION USING PERFORMANCE DATA

(71) Applicant: COX COMMUNICATIONS, INC., Atlanta, GA (US)

(72) Inventor: Jeffrey L. Finkelstein, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 15/875,838

(22) Filed: Jan. 19, 2018

(65) Prior Publication Data

US 2019/0229758 A1    Jul. 25, 2019

(51) Int. Cl.
*H04B 1/04* (2006.01)
*H04L 27/26* (2006.01)
*H04L 27/36* (2006.01)
*H04B 3/46* (2015.01)

(52) U.S. Cl.
CPC ............ *H04B 1/0475* (2013.01); *H04B 3/46* (2013.01); *H04L 27/2626* (2013.01); *H04L 27/36* (2013.01)

(58) Field of Classification Search
CPC ................................... H04B 1/0475
USPC ........................................................ 375/222
See application file for complete search history.

(56) References Cited

U.S. PATENT DOCUMENTS

| | | | | |
|---|---|---|---|---|
| 2003/0179830 | A1* | 9/2003 | Eidson | H04B 1/0475 375/296 |
| 2012/0263471 | A1* | 10/2012 | Buchali | H04B 10/255 398/74 |
| 2014/0169431 | A1* | 6/2014 | Arambepola | H04L 27/0006 375/227 |
| 2014/0294057 | A1* | 10/2014 | Joung | H04L 27/364 375/232 |
| 2016/0233980 | A1* | 8/2016 | Pantelias | H04L 1/0041 |

* cited by examiner

*Primary Examiner* — Lihong Yu
(74) *Attorney, Agent, or Firm* — Eversheds Sutherland (US) LLP

(57) ABSTRACT

In various embodiment, the disclosed systems, methods, and apparatuses describe the application of a pre-distortion at a transmitting device, such as a headend or a remote PHY device, to modify signals to be transmitted on a cable network in order to account for the distortions to the signals received by one or more devices on the network. In an embodiment, the pre-distortions can be implemented in the analog domain or in the digital domain, for example, using analog filters, or digital signal processing (DSP) devices. In an embodiment, the pre-distortion can be applied on particular subcarriers associated with the signals, without being applied to other subcarrier associated with the signals.

18 Claims, 8 Drawing Sheets

SYSTEMS AND METHODS FOR DETERMINING CABLE MODULATION USING PERFORMANCE DATA

BACKGROUND

A variety of service providers, such as cable providers and satellite providers, may connect user devices to one or more networks, such as cable networks and/or the Internet. A provider may provide cable and/or Internet access to a residence via devices such as headends that includes a computer system and databases required for provisioning of content. The headend may include cable modem termination system (CMTS), which can send and receives cable modem signals on a cable network to provide Internet services to cable subscribers. However, the residence may experience issues such as congestion, speed losses, pricing spikes, service interruptions, and the like that can degrade the user experience. Accordingly, there is a strong need in the market for systems and methods that remedy the aforementioned problems and challenges.

BRIEF DESCRIPTION OF THE DRAWINGS

Figure 1:
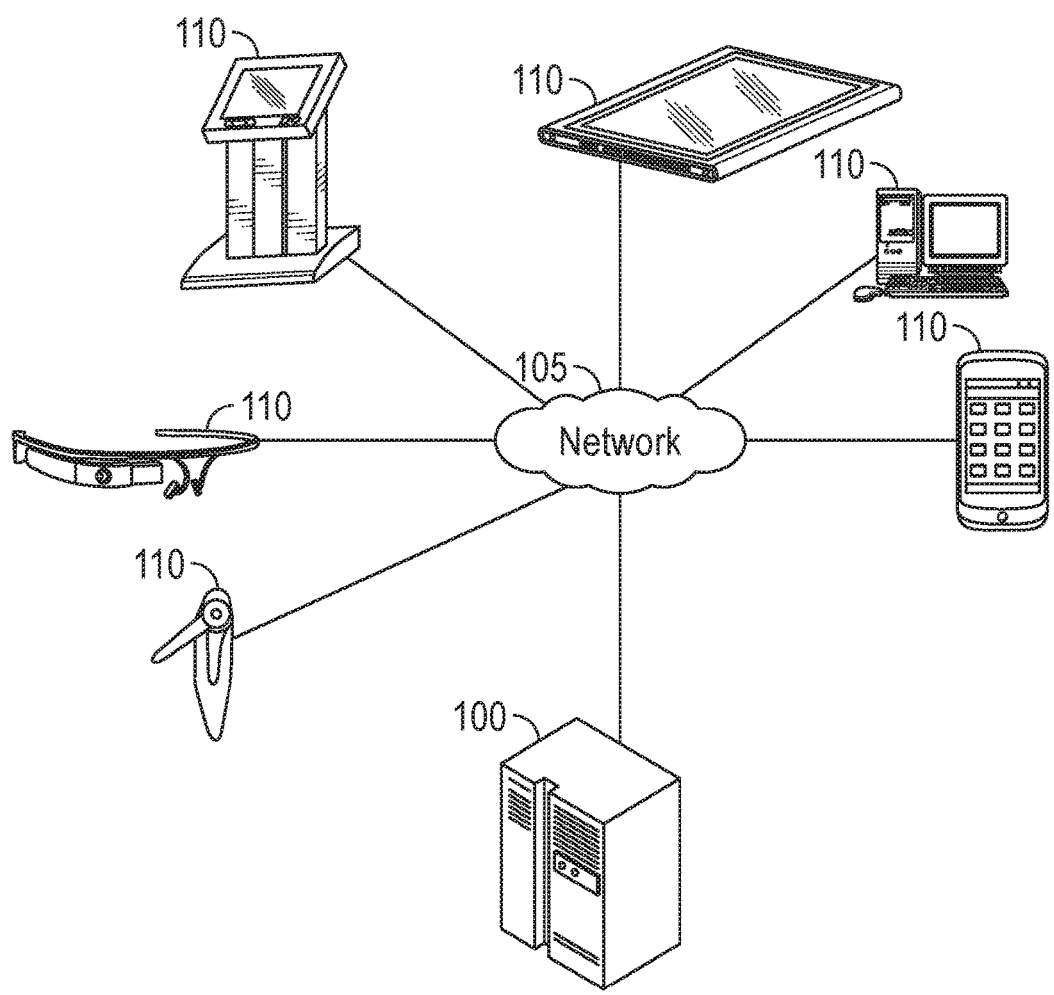
Figure 2:
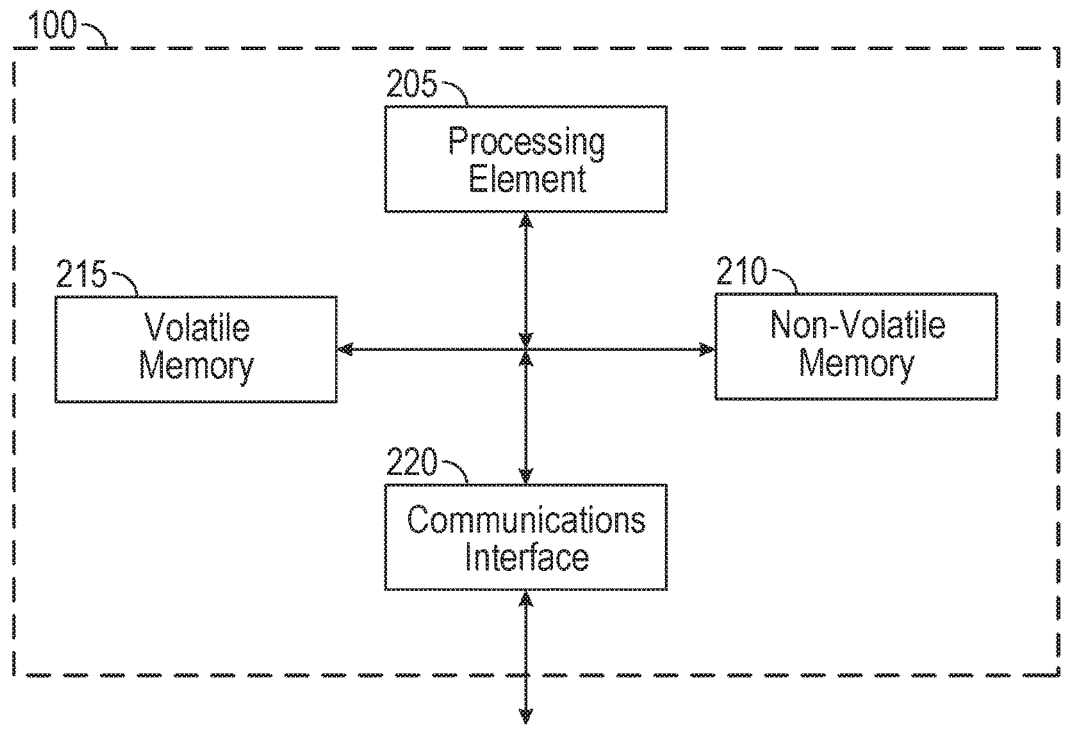
Figure 3:
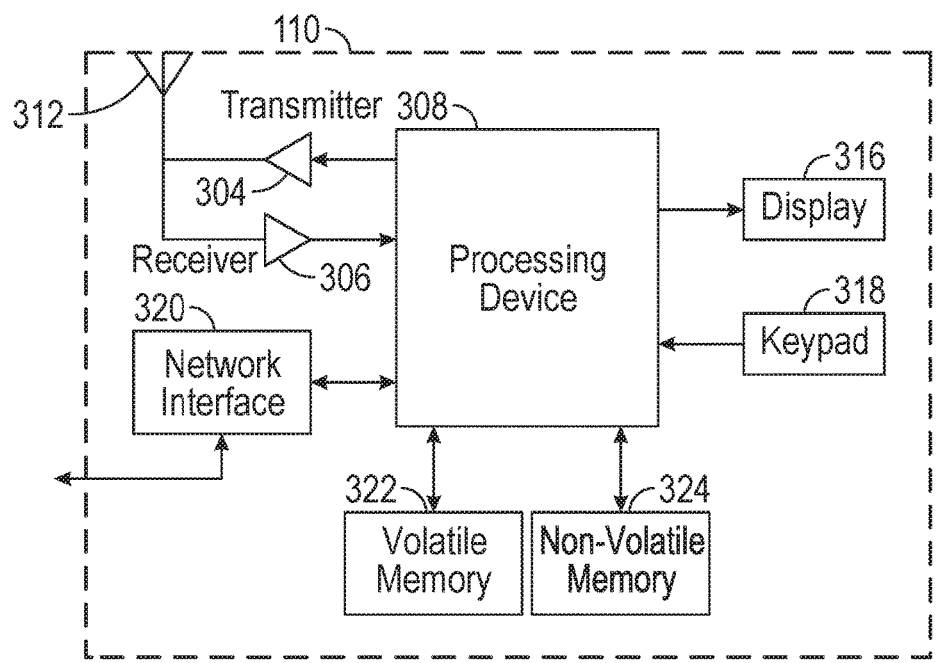
Figure 4:
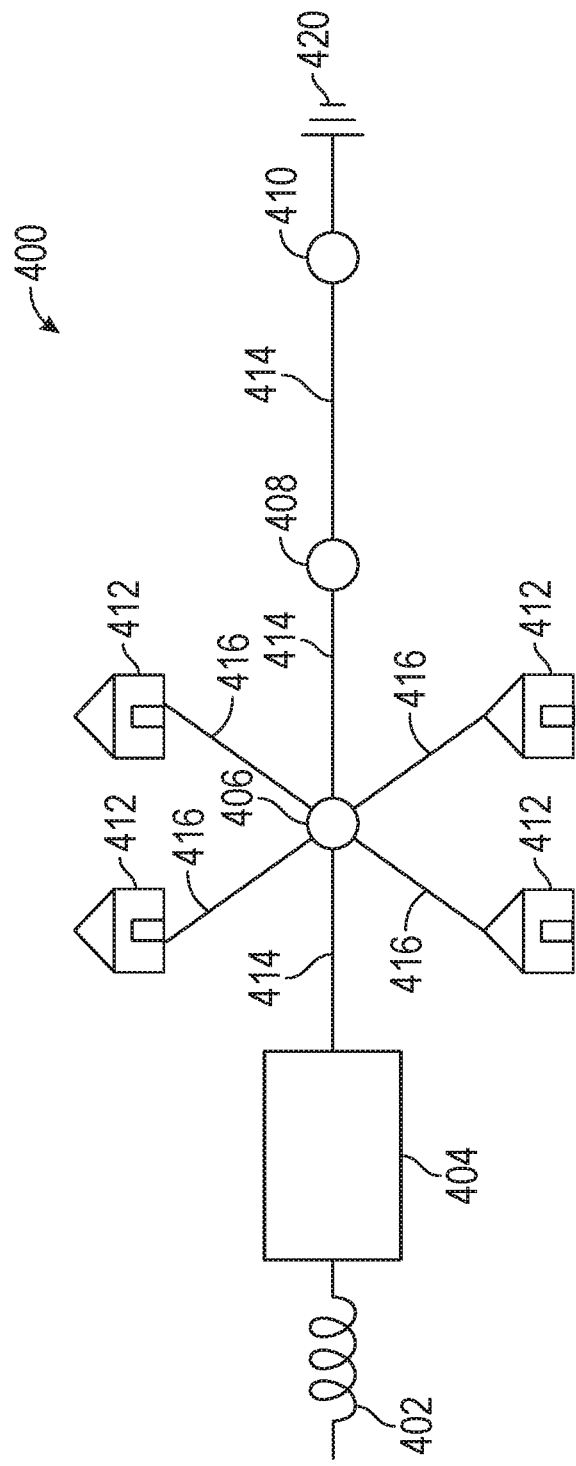
Figure 5A:
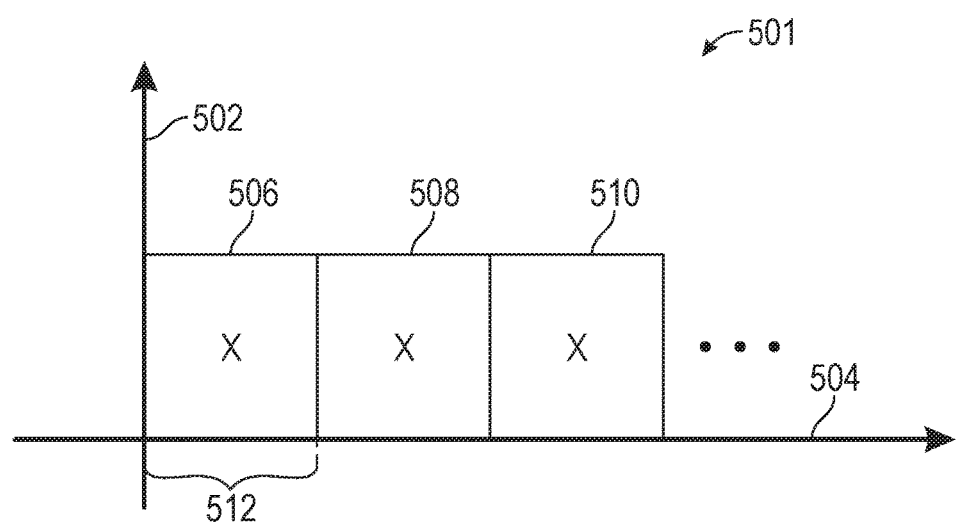
Figure 5B:
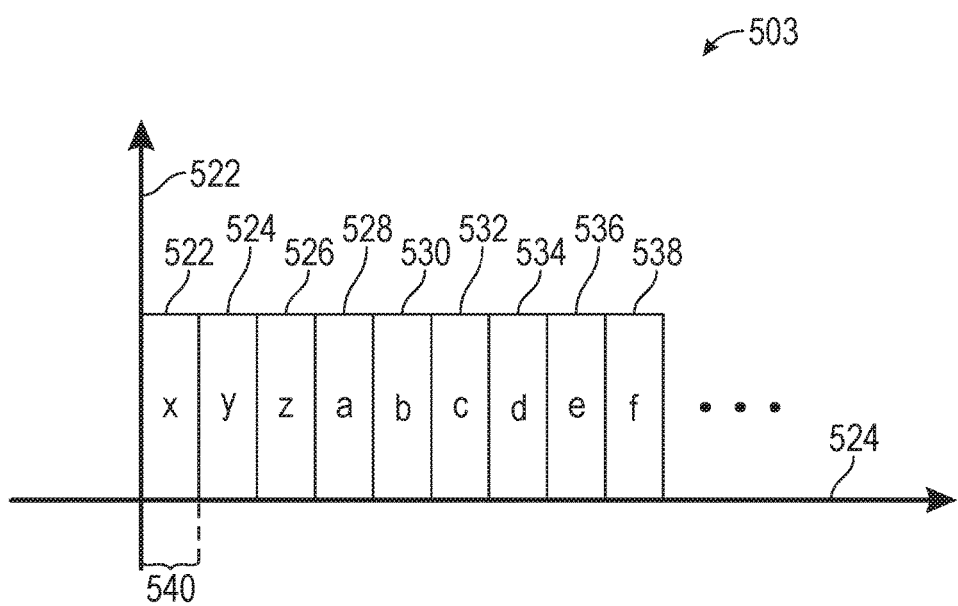
Figure 6:
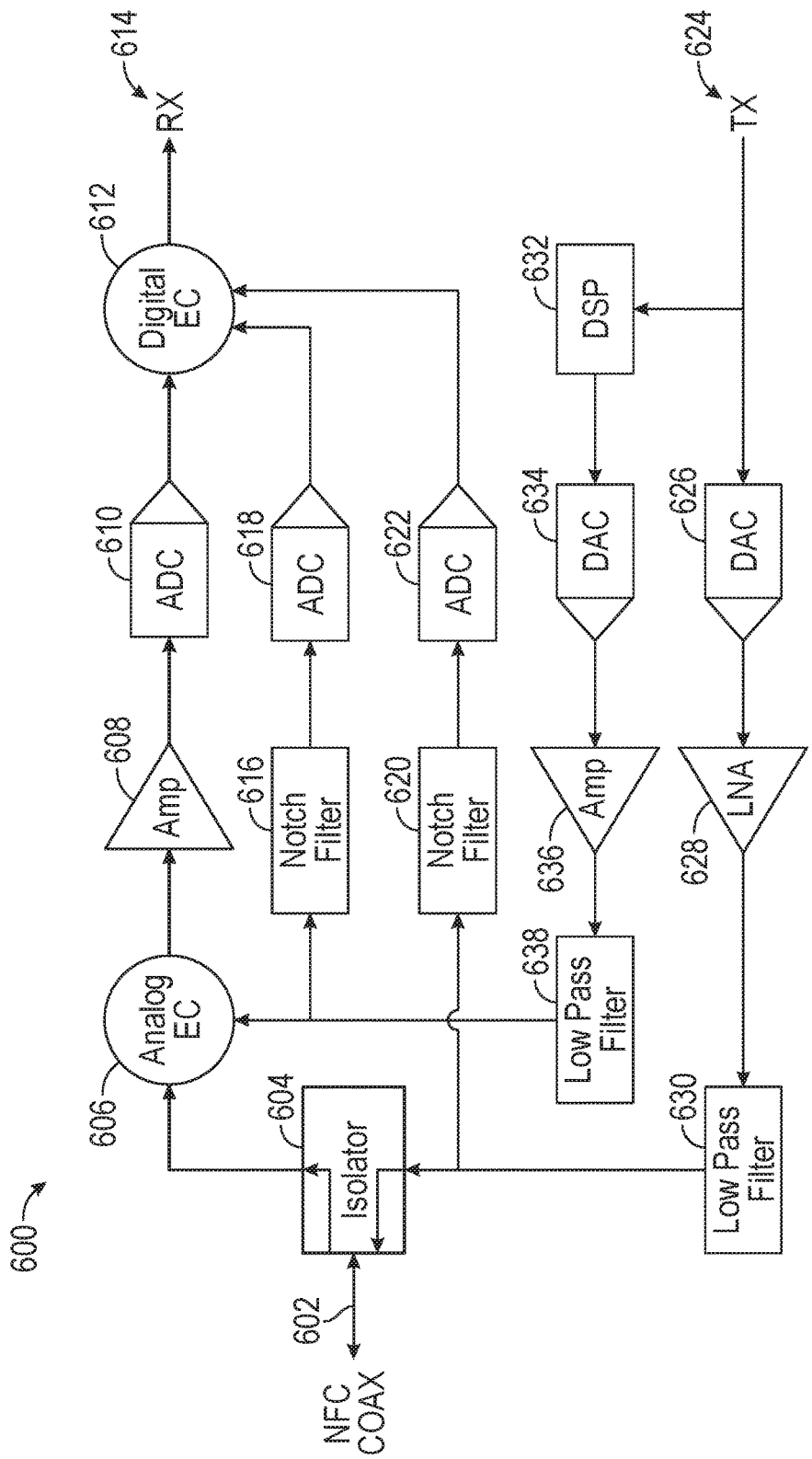
Figure 7A:
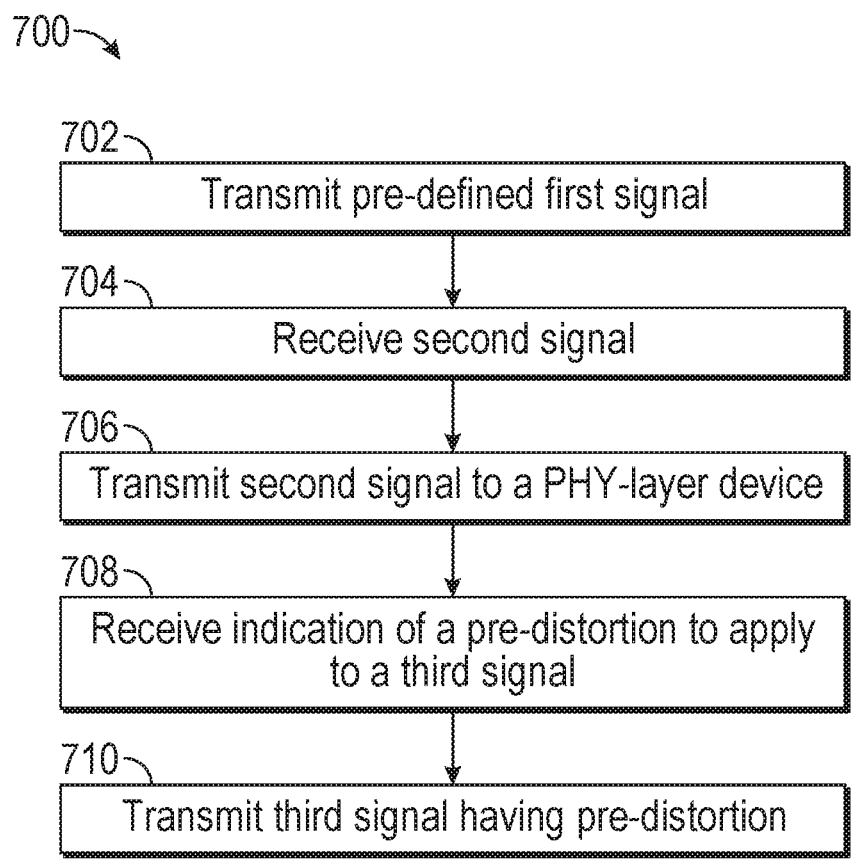
Figure 7B:
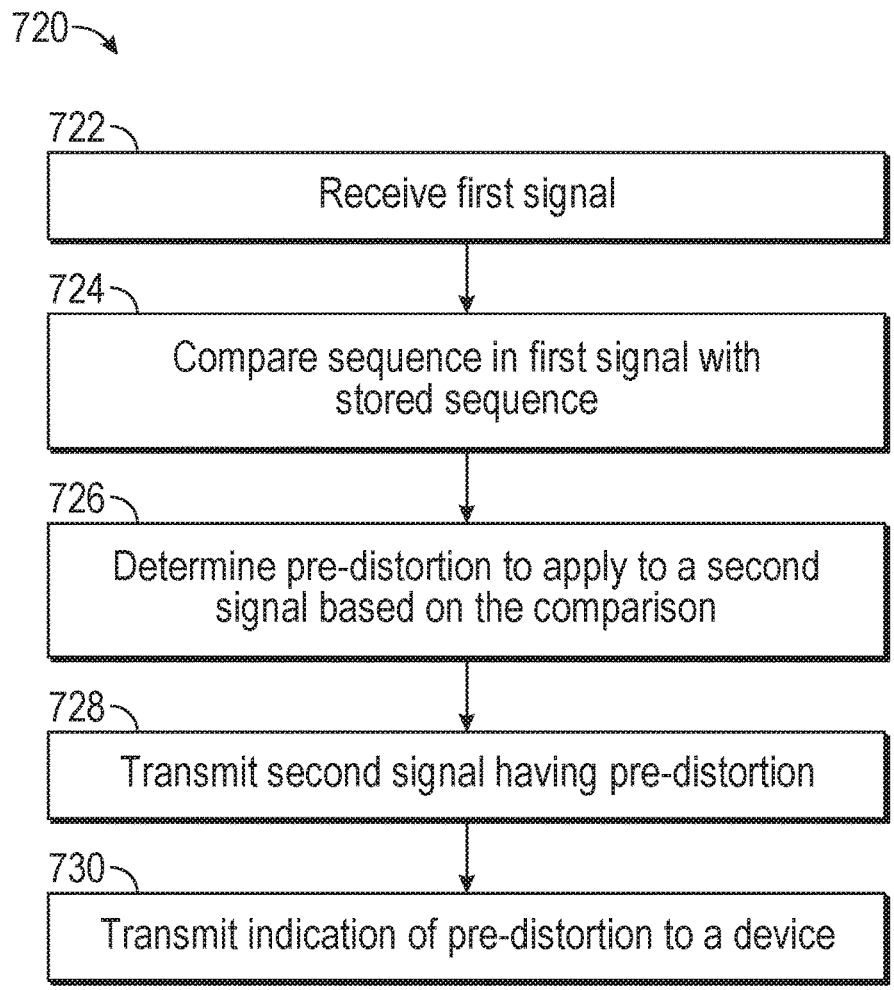

Having thus described the disclosure in general terms, reference will now be made to the accompanying drawings, which may not necessarily be drawn to scale, and wherein:

FIG. 1 is an overview of a system that can be used to practice example embodiments of the present disclosure;

FIG. 2 is an example schematic diagram of a management computing entity, in accordance with example embodiments of the disclosure;

FIG. 3 is an example schematic diagram of a user device, in accordance with example embodiments of the disclosure;

FIG. 4 shows an example schematic diagram of a portion of a cable network and associated devices, in accordance with example embodiments of the disclosure;

FIG. 5A shows an example schematic diagram of a plot of power spectral density (PSD) of subcarriers used in transmissions by devices over the network, in accordance with example embodiments of the disclosure;

FIG. 5B shows another an example schematic diagram of a plot of the PSD of subcarriers used in transmissions by devices over the network, in accordance with example embodiments of the disclosure;

FIG. 6 shows an example schematic diagram of an example device to be used to remove noise and/or distortions from signals transmitted by devices over the network, in accordance with example embodiments of the disclosure;

FIG. 7A shows a flow chart illustrating example operations that may be performed by one or more devices described in connection with the disclosed system, in accordance with various embodiments of the disclosure; and FIG. 7B shows another flow chart illustrating additional example operations that may be performed by one or more devices described in connection with the disclosed system, in accordance with various embodiments of the disclosure.

DETAILED DESCRIPTION OF VARIOUS EMBODIMENTS

This specification relates to a system and method for the application of a pre-distortion at a transmitting device, such as a headend or a remote physical (PHY) device, to modify signals to be transmitted on a cable network, in order to account for the distortions to the signals received by one or more devices on the network. In an embodiment, the pre-distortions can be implemented in the analog domain or in the digital domain, for example, using analog filters, or digital signal processing (DSP) devices. In an embodiment, the pre-distortion can be applied on particular subcarriers associated with the signals, without being applied to other subcarrier associated with the signals.

Other embodiments of this aspect include corresponding systems, apparatus, and computer programs, configured to perform the actions of the methods, encoded on computer storage devices.

Particular embodiments of the subject matter described herein can be implemented so as to realize one or more of the following advantages. Improve network stability and operational data transfer rates and, in turn, improve the user experience. Reduce the costs associated with routing network traffic, network maintenance, network upgrades, and/or the like.

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

I. Computer Program Products, Methods, and Computing Entities

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution.

For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Example System Architecture

FIG. 1 provides an illustration of an example embodiment of the present disclosure. As shown in FIG. 1, this particular embodiment may include one or more management computing entities 100, one or more networks 105, and one or more user devices 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Example Management Computing Entity

FIG. 2 provides a schematic of a management computing entity 100 according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user devices 110 and/or a variety of other computing entities.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for example purposes only and are not limiting to the various embodiments.

2. Example User Device

A user may be an individual, a family, a company, an organization, an entity, a department within an organization, a representative of an organization and/or person, and/or the like. In one example, users may be employees, residents, customers, and/or the like. For instance, a user may operate a user device 110 that includes one or more components that are functionally similar to those of the management computing entity 100. FIG. 3 provides an illustrative schematic representative of a user device 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 110 can be operated by various parties. As shown in FIG. 3, the user device 110 can include an antenna 312, a transmitter 304 (for example radio), a receiver 306 (for example radio), and a processing element 308 (for example CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the management computing entity 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 110 may operate in accordance with multiple wired communication standards and protocols, such as those described above with regard to the management computing entity 100 via a network interface 320.

Via these communication standards and protocols, the user device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (for example including executable instructions, applications, program modules), and operating system.

According to one embodiment, the user device 110 may include location determining aspects, devices, modules, functionalities, and/or similar words used herein interchangeably. For example, the user device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 110 position in connection with a variety of other systems, including cellular towers, Wi-Fi access points, and/or the like. Similarly, the user device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user device 110 to interact with and/or cause display of information from the management computing entity 100, as described herein. The user input interface can comprise any of a number of devices or interfaces allowing the user device 110 to receive data, such as a keypad 318 (hard or soft), a touch display, voice/speech or motion interfaces, or other input devices. In embodiments including a keypad 318, the keypad 318 can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the management computing entity 100 and/or various other computing entities.

In another embodiment, the user device 110 may include one or more components or functionality that are the same or similar to those of the management computing entity 100, as described in greater detail above. As will be recognized, these architectures and descriptions are provided for example purposes only and are not limiting to the various embodiments.

III. Example System Operation

FIG. 4 shows an example diagram 400 of a portion of a cable network and associated devices, in accordance with example embodiments of the disclosure. In an embodiment there can be a device 404; the device 404 can include a cable modem termination system (CMTS). In an embodiment, the device can have a converged cable access platform (CCAP) functionality. In another embodiment, the device 404 can serve as remote physical (PHY) device, that is, a device having PHY layer (of the open systems interconnection model, OSI model) functionality. In an embodiment there can be a fiber 414 connected to the device 404; the device 404 can further be connected to various network cable taps 406, 408, and 410, also referred to as taps herein.

In an embodiment, data can be transmitted downstream from the device 404 to one or more homes 412 over drop cables (also referred to as drops herein) 416 using one or more taps 406, 408, and 410. In an embodiment, as the data is transmitted downstream from the device 404 to one or more homes 412, the taps 412 can potentially generate various impairments on the network. Alternatively or additionally, as the signals pass through from the device 404 to the taps 406, 408, and 410 over fibers 414 and to the homes 412 over one or more drops 416, the fibers 414 and/or the drops 416 can cause the signals to undergo various impairments, for example, to the power spectral density of the signals. In an embodiment, the impairment can be due to attenuation on the fibers 414 and/or drops 416. In an embodiment, the impairments can lead to frequency distortions on the signals; for example, the higher frequency end of the signals may be attenuated. In an embodiment, one or more amplifiers (not shown) can be used to perform a gain on the attenuated signals. In an embodiment, the one or more amplifiers can be placed, for example, at one or more of the taps 406, 408, and 410 to perform the gain on the attenuated signals.

In an embodiment, the homes 412, the devices in the homes 412, and taps 406, 408, and/or 410 can introduce different distortions on the drop cables 416 and/or fibers 414. In an embodiment if the distortion is introduced on a given fiber 414 feeding a first tap 406 of the taps 406, 408, and/or 410, different homes of the homes 412 may receive a similar distortion to signals being transmitted and received from one or more devices at the homes 412. In another embodiment, a distortion in at given tap of the taps 406, 408, and/or 410, a distortion at a given drop of the drops 416, or distortions associated with one or more cables and/or wires of one or more devices in a given home of the homes 412, may cause signals being received and transmitted at the various taps 406, 408, and/or 410, and/or signal being transmitted or received by the devices in the different homes 412 to undergo different signal distortions.

Likewise, in an embodiment, if the devices at various homes 412 are transmitting data upstream, the distortion to the signals experienced by devices at different homes 412 can be different. In an embodiment, the disclosed systems, methods, and apparatuses describe what signals the various devices, for example, the various devices in the homes 412 may need to transmit to account for the different distortions on the network, as described above.

In an embodiment, a pre-distortion (also referred to as predistortion, predetermined distortion and/or applied distortion herein) applied, for example, at a transmitting device, such as a headend or a remote PHY device, can be used to modify the signals to be transmitted on the network, for example, in order to account for the distortions to the signals received by one or more devices on the network. In an embodiment, the pre-distortions can be implemented in the analog domain or in the digital domain, for example, using analog filters, or digital signal processing (DSP) devices.

In an embodiment, a given transmitting device on the network can transmit a pre-determined sequence, for example a 32-symbol (or any suitable number of symbol) sequence where each symbol includes a pre-determined amount of data, to the receiving devices. Accordingly, when the receiving devices receive the pre-determined sequence, the receiving devices may be programmed to be able to determine one or more characteristics that the signal associated with the received pre-determined sequence should have. Therefore, the receiving device can determine whether there is a deviation from the what the receiving device would have received absent distortions in the received signal.

In an embodiment, the receiving devices can take various measurements, for example, measurements to characterize one or more channels associated with signals received by the receiving device, and/or one or more measurements associated with he received signal from the transmitting device, including, but not limited to, signal-to-noise ratio (SNR) measurements, minimum end-of-line (MER) measurements, slopes measurements, amplitude measurements, ripple measurements, spike (for example, non-linear noise distortions) measurements, absolute received power per subcarrier measurements, error vector magnitude measurements, and the like. The receiving device can then transmit at least portions of the measurements in informational blocks, for example, as data packets, back to the transmitting device. The transmitting device can modify a table based on the received information from the receiving device, for example, a table stored in internal memory. In an embodiment, the table can include information such as what sequence the receiving device would have received absent any distortions to the signal, what sequence the receiving device actually received, what sequence the transmitting device received back from the receiving device (which may also be subject to further distortions), and/or any information indicative of the measurements taken by the receiving device of the channel and/or the received signal, as described above.

Accordingly, the transmitting device can determine, based on the table, what pre-distortion to apply to a given subcarrier associated with a signal when transmitting additional signals to the receiving devices. For example, in order to send a signal to one or more devices located at a given customer's home, the transmitting device (for example, a head-end device) may determine, based on the table, to apply a predetermined level of pre-distortion to a given subcarriers used to represent at a portion of a signal to be transmitted to receiving devices at the customer's home. In an embodiment, the pre-distortions to the given subcarrier(s) can be such that when the receiving devices receive the at least a portion of the signal, the power spectral density of the received portion of the signal is flat; alternatively or additionally, the optimum power spectral density for the amount of energy transmitted by the transmitting device can be obtained by the receiving device. In an embodiment, the process described above can be repeated periodically in time, for example, every approximately 20 milliseconds to approximately 100 milliseconds. That is, the pre-determined signal can be sent by transmitting device to the receiving device, which can analyze the signal and/or the channel periodically as described above, and transmit derivative information back to the transmitting device, which can then pre-distort future signals based on the information.

In an embodiment, FIG. 5A shows a diagram 501 of a plot of power spectral density (PSD) of subcarriers used in transmissions by devices over the network, in accordance with example embodiments of the disclosure. In an embodiment, diagram 501 depicts the PSD 502 plotted against frequency 504, and further shows example subcarriers 506, 508, and 510 that are modulated using a first modulation technique (for example, a first modulation technique "X," where "X" represents any known modulation technique), to transmit data and information over the network, for example, from a transmitting device to a receiving device over a cable network. In an embodiment, for transmissions over the network, various types of modulation and encoding schemes and methods can be used. For example, in an embodiment, a single carrier (SC) Quadrature Amplitude Modulation (QAM) can be used. In an embodiment, in transmissions including the example SC QAM transmissions, the subcarriers 506, 507, and/or 510 can have a predetermined frequency bandwidth 512. In an embodiment, the predetermined frequency bandwidth 512 can be approximately 6 MHz. In an embodiment, the subcarriers can be modulated using Orthogonal Frequency-Division Multiplexing (OFDM) for transmissions over the network. For example, the subcarriers 506, 507, and/or 510 can have a bandwidth 512 of, for example, approximately 50 KHz. In an embodiment, for the SC QAM case, the subcarriers 506, 507, and/or 510 may use the same modulation scheme, for example, modulation type "X".

In an embodiment, FIG. 5B shows another diagram 503 of a plot of power spectral density (PSD) of subcarriers used in transmissions by devices over the network, in accordance with example embodiments of the disclosure. In an embodiment, diagram 503 depicts the PSD 522 plotted against frequency 524, and further shows example subcarriers 522, 524, 526, 528, 530, 532, 534, 536, and 538 that are modulated using various, different modulation techniques, to transmit data and information over the network, for example, from a transmitting device to a receiving device over a cable network.

In an embodiment, for transmission over the cable network using OFDM and that make use of discreet receiving devices, the subcarriers 522, 524, 526, 528, 530, 532, 534, 536, and 538 can have different modulations types; for example, a first carrier 522 can have an "X" modulation, a second carrier 524 can have a second modulation "Y," and so on, where "X" and/or "Y" (and the like) can represent any know modulation types. Accordingly, the various subcarriers 522, 524, 526, 528, 530, 532, 534, 536, and 538, having, for example, an approximately 50 KHz bandwidth 540, can use different modulation schemes.

In an example embodiment, the transmitting device can begin transmitting a signal (for example, a signal including the predetermined sequence described above) at a first data rate, for example at approximately 6 bits per second per hertz (for example, using a 64 QAM modulation. The transmitting device can then determine, as a result of feedback from one or more receiving devices indicative of distortion having an associated magnitude below a predetermined threshold, to transmit signals at approximately 12 bits per second per hertz (for example, using 4K QAM), that is, at a higher modulation density. In an embodiment, the transmitting device can transmit a signal (for example, a signal including the predetermined sequence described above) at a first data rate, for example, at approximately 6 bits per second per hertz (for example, using 64 QAM), and then determine, as a result of feedback from one or more receiving devices, that there may be a significant amount of distortion to the signals transmitted. Accordingly, the transmitting device can determine to transmit signals at approximately 4 bits per second per hertz (for example, using 16 QAM), that is, at a lower modulation density.

Accordingly, in various embodiments, the transmitting device can, broadly characterized, sequence through operations of sending a signal to a receiving device, receiving a second signal from the receiving device, comparing the transmitted and received signal against internally stored tables, and determining whether to implement a pre-distortion based on the comparison, and implementing the pre-distortion for a future signal to be sent to receiving device(s).

In an embodiment the pre-distorted sequences transmitted as signals by the transmitting device and received at the receiving devices can have relatively flat received power versus frequency characteristics. In an embodiment, if the transmitting device determines that the receiving device determined a spike in the noise profile of the channel, the transmitting device may determine to not transmit any data in the frequency range of the noise spike. Accordingly, the transmitting device may determine to transmit no signal in a given frequency band, that is, to employ zero bit loading in an associated frequency band of the noise spike.

In another embodiment, the transmitting device may determine to, alternatively or additionally, pre-distort the signals to be transmitted to the receiving devices and/or to bit-load at least a portion of the signals to be transmitted to the receiving devices. In an embodiment the bit loading of the at least a portion of the signals may be done on a per subcarrier basis. For example, the transmitting device may determine to transmit data at a higher modulation (for example 4K QAM) for a portion of the signal that is at a higher frequency because the transmitting device has determined that the SNR of the received signal at the receiving device may be sufficient support the higher level of modulation. However, the transmitting device may determine to perform bit loading on a portion of the signal that is at lower frequencies, that is, to lower the transmitted power on the portion of the signal at lower frequencies to overcome channel noise and the like.

In an embodiment the transmitting device can transmit the signal indicative of the pre-determined sequence on a per-subcarrier basis, that is, for example, using different modulations for different portions of the signal (see, for example, FIG. 5B and related description). In an embodiment the transmitting device can receive the feedback signal from the receiving device and using this information, the transmitting device can sequence through the various subcarriers comprising the modulated signal associated with the pre-determined sequence. In an embodiment, the receiving device can send back one or more feedback signals indicative of a deviation from a baseline; that is, when the received signal at the receiving device (indicative of a predetermined sequence) has at least one parameter (for example, SNR, MER, received power, and the like) that is significantly different, for example above or below a given threshold, the receiving device can send back a feedback signal indicative of the deviation. In an embodiment, if, at the receiving device, the received signal indicative of a predetermined sequence has no parameters that exceed a given threshold, the receiving device may determine not to send any feedback signal back to the transmitting device; alternatively or additionally, the receiving device may determine to zero bit-load its feedback to the transmitting device.

In an embodiment, the transmitting device and/or the receiving device can timestamp the signals they send and receive to one another over the network. In an embodiment, the transmitting device can embed the predetermined sequence in every n-th (for example, every $20^{th}$) signal sent to the receiving device. In an embodiment, the transmitting device can embed the predetermined sequence in a header of a date frame associated with every n-th (for example, every $20^{th}$) signal sent to the receiving device.

In an embodiment the threshold for deviation of the received signal from the baseline can be based at least in part on an acceptable operating range. For example, for signals modulated at 4K QAM and transmitted by the transmitting device to the receiving device over the network, the SNR of the received signal at the receiving device may be needed to be approximately 47 dB in order to be received without significant distortion. In an embodiment, for different modulation densities, a different threshold can be determined. Further, for a different threshold criteria associated with the deviation of the received signal by the receiving device can be applied to a different portion of the same signal, on a per subcarrier basis. For example there may be a change of approximately 22 dB on the received power of the signal received at the receiving device when comparing the received power of signal on the lowest frequency as compared with the received power of the signal on the highest frequency. Accordingly, the transmitting device may need to pre-distort the various subcarriers associated with the transmitted signal differently based on the feedback signal received from the receiving device, that is, to pre-distort the signals on a per-subcarrier basis.

In an embodiment different impairments may occur to a signal sent from the transmitting device to a given receiving device, for example, a given receiving device in a house. For example the signal can enter into a house and go to a splitter having one leg for TV devices, while another side of the splitter could route the signal to a cable modem. Accordingly, 11 dB attenuation could be obtained on one side of the splitter but no significant attenuation may be obtained on the other side of the splitter.

In an embodiment, a receiving device (for example, a cable modem in a customer's home) may, as a result of the signaling to the transmitting device (for example, a headend and/or a remote PHY device) determine the level of pre-distortion it needs to apply to upstream signals the receiving device sends through the network to the transmitting device. In such a situation, the steps described above may be performed in reverse, that is, with the receiving device (for example, a cable modem in a customer's home) applying pre-distortion based feedback received from the normally transmitting device (that is, the headend device and/or remote PHY device).

In an embodiment, burst noise can occur in a non-linear fashion on the network. However, the methods described herein can be performed periodically, for example, every approximately 20 milliseconds to approximately 100 milliseconds; accordingly, the transmitting device and receiving device can still provide optimized signals over the network by avoiding the frequency bands on which the burst noise occurs, on a time averaged basis.

In an embodiment the receiving device can determine the error vector magnitude (EVM) of the received signal comprising a predetermined sequence, in order to determine how far the coordinates of a signal constellation represented by the received signal is from the coordinates of a constellation representing a signal including the predetermined sequence.

In an embodiment, the communication between the transmitting device and the receiving device can include at least initialization, ranging, and registration. In an embodiment initialization can include processes whereby the transmitting device sends information periodically (for example, every 100 milliseconds). In an embodiment the information can include Medium Access Control (MAC) management messages, channel information, and/or timing information, and the like.

In an embodiment the initialization can include processes that can be performed as a part of powering on a receiving device. That is, when the receiving device is turned on, the receiving device can scan and for energy on various bands available to the receiving device. Once the receiving device's tuner finds energy at a given frequency, the receiving device can try to tune into the energy. Accordingly, the receiving device can sequence through various messages, for example, management messages associated with a timer, as a part of synchronization process with the transmitting device. The receiving device can then transmit, at a predetermined time, a signal to the transmitting device indicative of the receiving device's presence on the network. Accordingly, the transmitting device can perform the one or more operation described herein broadly including the transmission of predetermined sequences to the receiving device, on a per subcarrier basis.

After initialization processes and/or as part of an initialization process, the receiving device can transmit a ranging request to the transmitting device to begin the ranging process. As a part of the ranging process, the transmitting device and/or the receiving device can determine what modulation to use for a given subcarrier for a given signal to transmit for communication between the transmitting device and the receiving device. In an embodiment, the receiving device and/or the transmitting device can communicate, to each other, a capability matrix indicative of what capabilities the devices have for transmitting and receiving data on the network. For example the receiving device or the transmitting device can indicate that the receiving device and/or the transmitting device are capable of locking into a 192 MHz upstream and 684 MHz downstream data frequency rate at up to approximately 1 GHz of bandwidth.

Accordingly, after the transmitting device and/or the receiving device what power and modulation scheme to use, the receiving device can perform a registration step to send further data. In an embodiment the registration step can include performing, by the receiving device and/or the transmitting device, one or more secrecy handshakes between the devices, for example, using encryption keys, public encryption, and the like. After finishing the registration phase, the transmitting device and/or the receiving device can communicate and send and receive data. In an embodiment, the ranging can include an initial ranging and a periodic ranging. In an embodiment, the periodic ranging can include various step of the initial ranging (similar to the ranging process described above), but that occurs periodically, for example, approximately every 20, 50, 100 milliseconds.

FIG. 6 shows a diagram of an example device to be used remove noise and/or distortions from signals transmitted by devices over the network, in accordance with example embodiments of the disclosure. In an embodiment, FIG. 6 shows an input signal 602 from a cable plant (not shown), for example, an Hybrid fiber-coaxial (HFC) cable plant. In another embodiment, the input signal 602 from the cable plant can include a co-axial bidirectional cable. In an embodiment, downstream data transmission, that is between the plant and a device (for example, a cable modem) can be first described. In an embodiment the input signal 602 can propagate from the plant to an isolator 604. In an embodiment the isolator 604 can include aspects of the functionality of a tap. In an embodiment the isolator 604 can send the signal to an analog echo canceler 606. In another embodiment the analog echo canceller 606 can reduce the echoes of the signal in the analog domain. In an embodiment the analog echo canceller 606 can reduce the echo, group delay, noise amplitude, and the like, of the signal. Accordingly, after the signal passes through the analog echo canceller 602, the signal may not be as strong, and therefore, the signal can be sent through an amplifier 610. The signal can then proceed to an analog to digital converter (ADC) 610 for conversion to the digital domain. In an embodiment, the signal can proceed thereafter to a digital echo canceller 612, which can remove echos and the like in the digital domain. In an embodiment, the output of the digital echo canceler 612 can be transmitted to the device, for example, a cable modem.

In an embodiment the various transmission of the devices (for example, different modems) on the same network and/or on the same cable, can lead to the generation of echoes, micro-reflections and the like on at least portions of the network. Accordingly, when a particular device (for example, a cable modem) transmits a signal back to the cable plant, the signal can incorporate artifacts from other, for example, neighboring, devices' transmissions, in addition to artifacts from signals transmitted from the cable plant to other devices.

Accordingly, in order to reduce the effect of these artifacts on upstream transmissions from the device to the cable plant, the signal can traverse the circuit 600 in various paths. On a first path, the signal can be sent to a DSP 632 to reduce the noise. In an embodiment, the DSP 632 can remove the noise of the constellation points associated with the modulation of the signal. Then the signal can be transmitted to a digital to analog converter (DAC) 634 to modify the signal to the analog domain. The signal can then be sent to an amplifier 636 to amplify the signal. Further, the signal can be sent to a low pass filter 638 to pass through the portion of the signal with a frequency lower than a certain cutoff frequency and to attenuate the portion of the signal with frequencies higher than the cutoff frequency. In an embodiment, the low pass filter 638 can send the filtered signal into the analog echo canceler 606.

In an embodiment, due to the several devices transmitting in the same portion of the spectrum, the different signals at lower signal strengths can take on some of the same characteristics of an echo. Accordingly, as the signal has been, prior to the transmission to the echo canceller 606, been through the low pass filter 638 to remove the noise in the lower part of the spectrum, the repetitive signals from the other devices, the repetitive signals resembling echos, can be removed. Further, the signal can be passed through a notch filter 616 to include only the sub carriers of interest, while removing any extraneous portions of the signal. The signal can then be passed through an ADC 618 to convert the signal back into the digital domain. Accordingly, the analog signal can then be fed into the digital echo canceler 612. As a result of the feedback loop of this path, the signal can undergo multiple rounds of echo and noise cancellation, resulting in a more pure signal for transmission to the cable plant.

In an embodiment, the signal transmitted from the device (for example, the cable modem) to the cable plant, can traverse through a second path. In an embodiment, the signal can be sent to a second DAC 626, to convert the signal into an analog domain. Further, the signal can then be sent to a low noise amplifier (LNA) 628 in order to amplify the low noise portion of the signal. Afterwards, the signal can proceed to the low pass filter 630. The signal can then be passed through a notch filter 620 to include only the sub-carriers of interest, while removing any extraneous portions of the signal. After that, the signal can be passed through an ADC 622 to convert the signal back into the digital domain. Accordingly, the analog signal can then be fed into the digital echo canceler 612. As a result of the feedback loop of this second path, the signal can undergo multiple rounds of echo and noise cancellation, resulting in a more pure signal for transmission to the cable plant.

In an embodiment, the circuitry 600 can be included in the device, for example, the cable modem, or higher in the network, for example, in the remote PHY. In an embodiment, the circuitry 600 can be included in both the device, for example, the cable modem and the remote PHY device, and the like. In an embodiment, the signal, having traversed through the circuit 600 can have a resulting SNR below a given threshold, for example, below earth noise.

FIG. 7A shows a flow chart 700 illustrating example operations that may be performed by one or more devices described in connection with the disclosed systems and methods, in accordance with various embodiments of the disclosure. At block 702, a first device can transmit a pre-defined first signal including a first sequence to a second device. In an embodiment, the first device can include a transmitting device, for example, a head-end device and/or a remote PHY device, or the like. In an embodiment, the second device can include a receiving device, for example, a cable modem device and/or a customer premise device. In an embodiment, the transmission can be performed over a network, for example, a cable network. In an embodiment, for transmission over the cable network using OFDM and further, using discreet receiving devices, the subcarriers used to transmit the signal carrying the pre-defined first-sequence can have different modulations; for example, a first carrier can have a first modulation, a second carrier can have a second modulation, and so on. In an example embodiment, the transmitting device can transmit the pre-defined first sequence at a first data rate, for example 6 bits per second per hertz (for example, using a 64 QAM modulation). In an embodiment, one or more homes including the receiving devices and/or taps between the transmitting device and the receiving device can introduce different distortions to the pre-defined first sequence, for example, through drop cables and/or fibers between the receiving device and the receiving device. In an embodiment, the pre-determined sequence can include a 32 symbol sequence where each symbol includes a pre-determined amount of data, to the receiving device.

At block 704, the first device can receive a second signal including a second sequence from the second device. In an embodiment, the first device can include a transmitting device, for example, a head-end device and/or a remote PHY device. In an embodiment, the second device can include a receiving device, for example, a cable modem device and/or a customer premise device. In an embodiment, the receiving device may be programmed to have determined the characteristics the signal associated with the anticipated received pre-determined first sequence should have, without any distortions. Therefore, the receiving device can determine whether there is a deviation, for example, a deviation from the expected sequence in the received pre-determined first sequence. In an embodiment, the deviation can exist between what the receiving device would have received absent distortions to the received signal. In an embodiment, the receiving devices can further take various measurements, for example, measurements to characterize the channel, and/or one or more measurements associated with he received signal from the transmitting device, including, but not limited to, the SNR, the MER, the slopes, the amplitude, the ripple, any noise spikes (which can be non-linear), the absolute received power per subcarrier, the error vector magnitude, and the like.

At block 706, the first device can transmit a second signal including the second sequence to a PHY-layer device. In an embodiment, the first device can include a transmitting device, for example, a head-end device and/or a remote PHY device. In an embodiment, the second device can include a receiving device, for example, a cable modem device and/or a customer premise device. In an embodiment, the PHY-layer device can include a device or a portion of device that has physical layer functionality. In an embodiment, the PHY-layer device can include a portion of the first (transmitting) device.

In an embodiment, the receiving device can then transmit measured information described in connection with step 404 above, back to the transmitting device. The transmitting device can use the PHY-layer device to modify, based on the received information from the receiving device, a table, for example, a table stored in memory. In an embodiment, the table can include information such as what sequence the receiving device would have received absent any distortions to the signal, what the receiving device actually received, what signal the transmitting device and/or the PHY-layer device received back from the receiving device, and/or any information indicative of the measurements taken by the receiving device of the channel and/or the received signal, as described above. For example, in order to send a signal to a given customer's home, the transmitting device and/or the PHY-layer device may determine, based on the table, to apply a predetermined level of pre-distortion to a given subcarrier used to represent a portion of a signal to be transmitted to receiving devices such that when the receiving devices receive the signal, the power spectral density of the received signal is flat, and/or the optimum power spectral density for the amount of energy transmitted by the transmitting device is obtained by the receiving device.

In an embodiment, the receiving device can send back a feedback signal indicative of a deviation from a baseline case; that is, when the received signal at the receiving device (indicative of a predetermined sequence) has at least one parameter (for example, SNR, MER, received power, and the like) that is significantly different, for example above or below a given threshold, the receiving device can send back a feedback signal indicative of the deviation. In an embodiment, if, at the receiving device, the received signal indicative of the first predetermined sequence has no parameters that exceed a given threshold, the receiving device may determine not to send any feedback signal back to the transmitting device; alternatively or additionally, the receiving device may determine to zero bit-load its feedback to the transmitting device.

In an embodiment, the transmitting device and/or the receiving device can timestamp the signals they send and receive to one another over the network. In an embodiment the threshold for deviation of the received signal from the baseline can be based at least in part on an acceptable operating range. For example, for signals modulated at 4K QAM and transmitted by the transmitting device to the receiving device over the network, the SNR may be needed to be approximately 47 dB in order to be received without significant distortion. In an embodiment, for different modulation densities, a different threshold can be determined. Further, for a different threshold criteria associated with the deviation of the received signal by the receiving device can be applied to a different portion of the same signal, on a per subcarrier basis. For example there may be a change of approximately 22 dB on the received power of the signal received at the receiving device when comparing the received power of signal on the lowest frequency as compared with the received power of the signal on the highest frequency. Accordingly, the transmitting device and/or the PHY-layer device may need to pre-distort the various subcarriers associated with the transmitted signal differently based on the feedback signal received from the receiving device, that is, to pre-distort the signals on a per-subcarrier basis.

At block 708, the first device can receive an indication of a pre-distortion to apply to a third signal including a third sequence for transmission to the second device. In an embodiment, a pre-distortion applied, for example, at a transmitting device, such as a headend or a remote PHY device, can be used to modify the signals to be transmitted on the network, in order to account for the different distortions seen by one or more receiving devices on the network. In an embodiment, the pre-distortions can be implemented in the analog domain or in the digital domain.

In an embodiment, the first device can include a transmitting device, for example, a head-end device and/or a remote PHY device. In an embodiment, the second device can include a receiving device, for example, a cable modem device and/or a customer premise device. In an embodiment, the third sequence can represent an information that contains content (such as cable programming) for presentation at the receiving device.

At block 710, the first device can transmit the third signal including the third sequence having the pre-distortion to the second device. In an embodiment, the first device can include a transmitting device, for example, a head-end device and/or a remote PHY device. In an embodiment, the second device can include a receiving device, for example, a cable modem device and/or a customer premise device. In an embodiment, if the transmitting device can determine that the receiving device determined a spike in the noise profile of the channel, the transmitting device may determine to not transmit any data in the frequency range of the noise spike. Accordingly, the transmitting device may determine to transmit no signal in a given frequency band, that is, to employ zero bit loading.

In another embodiment, the transmitting device may determine to, alternatively or additionally, pre-distort the signal indicative of the third sequence to be transmitted to the receiving devices and/or to bit-load at least a portion of the signal indicative of the third sequence to be transmitted to the receiving devices. In an embodiment the bit loading of the at least a portion of the signal indicative of the third sequence may be done on a per subcarrier basis. For example, the transmitting device may determine to transmit data at a higher modulation (for example 4K QAM) for a portion of the signal that is at a higher frequency because the transmitting device has determined that the SNR may be sufficient support that level of modulation. However, the transmitting device may determine to perform bit loading on a portion of the signal that is at lower frequencies, that is, to lower the transmitted power on the portion of the signal at lower frequencies to overcome channel noise and the like.

FIG. 7B shows another flow chart 720 illustrating example operations that may be performed by one or more devices described in connection with the disclosed systems and methods, in accordance with various embodiments of the disclosure. At block 722, the second device can receive a signal including a first sequence from a first device. In an embodiment, the first device can include a transmitting device, for example, a head-end device and/or a remote PHY device. In an embodiment, the second device can include a receiving device, for example, a cable modem device and/or a customer premise device.

In an embodiment, the transmission can be performed over a network, for example, a cable network. In an embodiment, for transmission over the cable network using OFDM and further, using discreet receiving devices, the subcarriers used to transmit the signal carrying the pre-defined first-sequence can have different modulations; for example, a first carrier can have a first modulation, a second carrier can have a second modulation, and so on. In an example embodiment, the transmitting device can transmit the pre-defined first sequence at a first data rate, for example 6 bits per second per hertz (for example, using a 64 QAM modulation).

At block 724, the first device can compare the signal including the sequence with a stored sequence. In an embodiment, the table can include information such as what sequence the receiving device would have received absent any distortions to the signal, what the receiving device actually received, what signal the transmitting device and/or the PHY-layer device received back from the receiving device, and/or any information indicative of the measurements taken by the receiving device of the channel and/or the received signal, as described above. For example, in order to send a signal to a given customer's home, the transmitting device and/or the PHY-layer device may determine, based on the table, to apply a predetermined level of pre-distortion to a given subcarrier used to represent a portion of a signal to be transmitted to receiving devices such that when the receiving devices receive the signal, the power spectral density of the received signal is flat, and/or the optimum power spectral density for the amount of energy transmitted by the transmitting device is obtained by the receiving device.

At block 726, the first device can determine a pre-distortion to apply to a signal based on the comparison. In an embodiment, a pre-distortion applied, for example, at a transmitting device, such as a headend or a remote PHY device, can be used to modify the signals to be transmitted on the network, in order to account for the different distortions seen by one or more receiving devices on the network. In an embodiment, the pre-distortions can be implemented in the analog domain or in the digital domain.

In another embodiment, the transmitting device may determine to, alternatively or additionally, pre-distort the signal indicative of the third sequence to be transmitted to the receiving devices and/or to bit-load at least a portion of the signal indicative of the third sequence to be transmitted to the receiving devices. In an embodiment the bit loading of the at least a portion of the signal indicative of the third sequence may be done on a per subcarrier basis. For example, the transmitting device may determine to transmit data at a higher modulation (for example 4K QAM) for a portion of the signal that is at a higher frequency because the transmitting device has determined that the SNR may be sufficient support that level of modulation. However, the transmitting device may determine to perform bit loading on a portion of the signal that is at lower frequencies, that is, to lower the transmitted power on the portion of the signal at lower frequencies to overcome channel noise and the like.

At block 728, the first device can transmit a second signal including the second sequence having pre-distortion to the second device. In an embodiment, if the transmitting device can determine that the receiving device determined a spike in the noise profile of the channel, the transmitting device may determine to not transmit any data in the frequency range of the noise spike. Accordingly, the transmitting device may determine to transmit no signal in a given frequency band, that is, to employ zero bit loading.

In another embodiment, the transmitting device may determine to, alternatively or additionally, pre-distort the signal indicative of the third sequence to be transmitted to the receiving devices and/or to bit-load at least a portion of the signal indicative of the third sequence to be transmitted to the receiving devices. In an embodiment the bit loading of the at least a portion of the signal indicative of the third sequence may be done on a per subcarrier basis. For example, the transmitting device may determine to transmit data at a higher modulation (for example 4K QAM) for a portion of the signal that is at a higher frequency because the transmitting device has determined that the SNR may be sufficient support that level of modulation. However, the transmitting device may determine to perform bit loading on a portion of the signal that is at lower frequencies, that is, to lower the transmitted power on the portion of the signal at lower frequencies to overcome channel noise and the like.

At block 730, the first device can transmit an indication of the pre-distortion to a device. In an embodiment, the indication of the pre-distortion can be transmitted to another device on the network, for example, to provide the other device with relevant information on the channel conditions and/or signal conditions experienced by the first device. In an embodiment, the other device can use this information to apply additional distortions or to remove distortions from signals received by the first device, or other devices on the network.

IV. Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an implementation of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

V. CONCLUSION

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method, comprising:
   transmitting a first signal to a device over a network, wherein the first signal is represented by subcarriers that are modulated using at least one modulation technique;
   receiving a second signal from the device over the network, the second signal indicative of a change between the subcarriers associated with the first signal and a received signal at the device;
   determining a pre-distortion based on the second signal;
   generate a third signal by applying the pre-distortion to a content signal, the pre-distortion comprising a modulation of a first subcarrier of the content signal; and
   transmitting the third signal to the device over the network.

2. The method of claim 1, further comprising receiving a fourth signal from the device, the fourth signal indicative of one or more of a signal-to-noise ratio (SNR) measurement, a minimum end-of-line (MER) measurement, a slope measurement, an amplitude measurement, a ripple measurement, an absolute received power per subcarrier measurement, or an error vector magnitude measurement.

3. The method of claim 2, wherein the determining of the pre-distortion is further based on the fourth signal.

4. The method of claim 1, wherein the determining of the pre-distortion further comprises determining the pre-distortion on a first subcarrier of the subcarriers.

5. The method of claim 1, wherein modifying the second signal further comprises applying the pre-distortion to a first subcarrier of subcarriers that represent the second signal.

6. The method of claim 1, wherein the at least one modulation technique comprises a single carrier (SC) quadrature amplitude modulation (QAM) modulation.

7. The method of claim 1, wherein the at least one modulation technique comprises orthogonal frequency-division multiplexing (OFDM) modulation.

8. The method of claim 1, wherein at least a portion of the third signal associated with a portion of a bandwidth of third signal is zero bit loaded.

9. The method of claim 1, wherein the first signal is embedded in a header of a data frame associated with a signal after a predetermined number of signals are sent to the device.

10. A system, comprising:
    a first device comprising a headend;
    a second device a cable modem;
    transmitting, by the first device, a first signal to a second device over a network, wherein the first signal is represented by subcarriers that are modulated using at least one modulation technique;
    receiving, by the first device, a second signal from the second device over the network, the second signal indicative of a change between the subcarriers associated with the first signal and a received signal at the second device;
    determining, by the first device, a pre-distortion based on the second signal;
    generate, by the first device, a third signal by applying the pre-distortion to a content signal, the pre-distortion comprising a modulation of a first subcarrier of the content signal; and
    transmitting, by the first device, the third signal to the second device over the network.

11. The system of claim 10, further comprising receiving a fourth signal from the second device, the fourth signal indicative of one or more of a signal-to-noise ratio (SNR) measurement, a minimum end-of-line (MER) measurement, a slope measurement, an amplitude measurement, a ripple measurement, an absolute received power per subcarrier measurement, or an error vector magnitude measurement.

12. The system of claim 11, wherein the determining, by the first device, of the pre-distortion is further based on the fourth signal.

13. The system of claim 10, wherein the determining, by the first device, the pre-distortion further comprises determining, by the first device, the pre-distortion on a first subcarrier of the subcarriers.

14. The system of claim 10, wherein modifying, by the first device, the second signal further comprises applying the pre-distortion to a first subcarrier of subcarriers that represent the second signal.

15. The system of claim 10, wherein the at least one modulation technique comprises a single carrier (SC) quadrature amplitude modulation (QAM) modulation.

16. The system of claim 10, wherein the at least one modulation technique comprises orthogonal frequency-division multiplexing (OFDM) modulation.

17. The system of claim 10, wherein at least a portion of the third signal associated with a portion of a bandwidth of third signal is zero bit loaded.

18. The system of claim 10, wherein the first signal is embedded in a header of a data frame associated with a signal after a predetermined number of signals are sent to the second device.

* * * * *